United States Patent [19]

Hubbard, Jr. et al.

[11] Patent Number: 5,054,323
[45] Date of Patent: Oct. 8, 1991

[54] PRESSURE DISTRIBUTION CHARACTERIZATION SYSTEM

[75] Inventors: James E. Hubbard, Jr., Derry, N.H.; Shawn E. Burke, North Reading, Mass.

[73] Assignee: The Charles Stark Draper Laboratory, Inc., Cambridge, Mass.

[21] Appl. No.: 333,108

[22] Filed: Apr. 4, 1989

[51] Int. Cl.$^5$ .............................................. G01L 9/00
[52] U.S. Cl. .............................. 73/754; 73/DIG. 4; 310/338; 338/4
[58] Field of Search ............... 73/754, 753, DIG. 4, 73/708, 714, 718, 724; 310/338, 311, 330, 331; 338/4

[56] References Cited

U.S. PATENT DOCUMENTS

| | | | |
|---|---|---|---|
| 2,558,563 | 6/1951 | Janssen | 73/DIG. 4 |
| 3,004,176 | 10/1961 | Mason et al. | 73/DIG. 4 |
| 3,299,711 | 1/1967 | Hatschek | 73/754 |
| 3,365,400 | 1/1968 | Pulvari | 73/DIG. 4 |
| 3,621,328 | 11/1971 | Epstein et al. | 310/311 |
| 3,787,764 | 1/1974 | Andeen et al. | 73/754 |
| 4,467,656 | 8/1984 | Mallon et al. | 73/DIG. 4 |
| 4,586,110 | 4/1986 | Yamamoto | 310/311 |
| 4,615,214 | 10/1986 | Burns | 310/338 |
| 4,649,312 | 3/1987 | Robin et al. | 310/338 |
| 4,737,676 | 4/1988 | Engel et al. | 73/754 |
| 4,868,447 | 9/1989 | Lee et al. | 310/328 |

FOREIGN PATENT DOCUMENTS 2133394 7/1977 Fed. Rep. of Germany ........ 73/754
2497345 7/1982 France .............................. 310/338

OTHER PUBLICATIONS

Sato et al. (5/1980), Applied Optics 19:1430–1434.
Sato et al. (10/1982), Applied Optics 21:3664–3668.
Kokorowski (1/1979), J. Opt. Soc. Am. 69:181–187.

Primary Examiner—Donnie L. Crosland
Assistant Examiner—Brent A. Swarthout
Attorney, Agent, or Firm—Lahive & Cockfield

[57] ABSTRACT

The present invention is a device for characterizing pressure distributions on a rigid surface with respect to at least one reference (x) axis. The device includes a substrate electrode disposed on the rigid surface for which the pressure distribution is to be characterized. An electrically conductive material may form the substrate electrode, or where the rigid surface itself is electrically conductive, that rigid surface may form the substrate electrode. A piezo film is disposed on and overlying the rigid surface. A sensor electrode is disposed on and overlying at least part of the piezo film. In one form of the invention the sensor electrode of a measurement cell is a composite electrode including at least two electrically isolated portions. One portion has a dimension transverse to the reference axis which varies in proportion to position (x) along the reference axis, and the other portion has a dimension transverse to the reference axis which varies in proportion to one minus position $(1-x)$ along the reference axis.

30 Claims, 3 Drawing Sheets

PRESSURE DISTRIBUTION CHARACTERIZATION SYSTEM

BACKGROUND OF INVENTION

This invention relates to pressure sensors and more particularly to systems that measure and characterize pressure distributions on rigid aerodynamic and/or hydrodynamic surfaces which are subjected to dynamic and/or static pressure fields.

Prior art utilize measuring systems that employ a plurality of pitot tubes and/or a plurality of solid state discrete semiconductor pressure transducers located at predetermined positions on the surface. The discrete pressure sensing instruments report information related only to the pressure sensed at a discrete position on the surface. Appropriate instrumentation is used to compute the desired pressure distributions from the discrete transducer measurements.

A Primary shortcoming of the prior art is the severely limited spatial resolution and system accuracy. The spatial resolution is restricted due to physical constraints of the pressure sensing instruments and discrete measuring technique utilized by the prior art. The localized nature of the measured data and the procedure utilized to approximate a continuous spatial representation from discrete measurements may severely limit the system's accuracy. As a result these systems require substantial electronic support and appropriate instrumentation with high computational requirements to compensate for the inability to sense the pressure at a continuum of locations on the surface. Thus, these type systems are capable of only approximating the actual dynamic pressure parameters of the entire surface from the discrete measurements along the surface. Furthermore, these systems tend to be heavy, large and high cost designs.

BRIEF DESCRIPTION OF DRAWINGS

The foregoing and other objects of this invention, the various features thereof, as well as the invention itself, may be more fully understood from the following description, when read together with the accompanying drawings in which.

SUMMARY OF THE INVENTION

The present invention utilizes a selectively shaped electrode to condition, for example by shading or weighting, the strain response of a piezo layer to measure and characterize static and/or dynamic pressure parameters adjacent to a rigid surface.

The present invention is a device for characterizing pressure distributions on a rigid surface with respect to at least one reference (x) axis. The device includes a substrate electrode disposed on the rigid surface for which the pressure distribution is to be characterized. An electrically conductive material may form the substrate electrode, or where the rigid surface is itself electrically conductive, that rigid surface may form the substrate electrode.

A piezo film is disposed on and overlying the rigid surface. Piezo layer, for example piezoelectric and piezoresistive materials, is comprised of a material that has at least one electrical parameter that is a function of an applied stress. By way of example, a piezo film comprised of a piezoelectric material, may be a polymer film such as polyvinylidene fluoride ($PVF_2$). In various embodiments, the piezo film may be substantially uniform in thickness, or may vary in thickness over the rigid surface.

A sensor electrode is disposed on and overlying at least part of the piezo film. In one form of the invention the sensor electrode of a measurement cell is a composite electrode including at least two electrically isolated portions. One portion has a dimension transverse to the reference axis which varies in proportion to position (x) along the reference axis, and the other portion has a dimension transverse to the reference axis which varies in proportion to one minus position $(1-x)$ along the reference axis. With this configuration, a first network may be coupled to the first portion of the sensor electrode for generating a $C_m$ signal representative of the potential difference between the first portion and the substrate electrode. A second network may be coupled to the first and said second portions of the sensor electrode for generating a $C_l$ signal representative of the sum of the potential difference between the first portion and the substrate electrode and the potential difference between the second portion and the substrate electrode.

A third network is responsive to the $C_m$ signal and the $C_l$ signal to generate a CP signal representative of the ratio of the $C_m$ signal and said $C_l$ signal. In this configuration, the CP signal corresponds to the center of pressure characteristic of the rigid surface along the reference axis.

In another form of the invention, the sensor electrode fully overlies the piezo film and is coupled to the sensor and substrate electrodes to generate a signal representative of the potential difference between the sensor electrode and said substrate electrode. This resultant signal corresponds to the zero$^{th}$ moment of the rigid surface about the reference axis.

In yet another form of the invention, the sensor electrode has a dimension transverse to the reference axis which varies in proportion to position (x) along the reference axis, and a network is coupled to the sensor and substrate electrodes to generate a signal representative of the potential difference between the sensor electrode and the substrate electrode. This resultant signal corresponds to the first moment with respect to the rigid surface about the reference axis.

In still another form of the invention, the sensor electrode has a dimension transverse to the reference axis which varies in proportion to the square of position ($x^2$) along the reference axis, and a network is coupled to the sensor and substrate electrodes to generate a signal representative of the potential difference between the sensor electrode and said substrate electrode. This resultant signal corresponds to the second moment of the rigid surface about the reference axis.

DESCRIPTION OF THE PREFERRED EMBODIMENT

Figure 1:
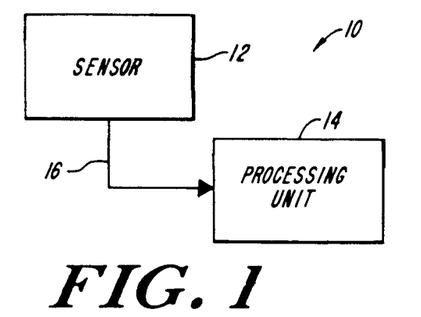
FIG. 1 is a block diagram schematic of the system in accordance with a preferred embodiment of the present invention.

FIG. 1 shows a measurement system 10 embodying the invention. System 10 is comprised of a sensor 12, a processing unit 14 and an electrical bus 16 which transfers electrical signals from the sensor 12 to the processing unit 14. The processing unit 14 manipulates these electrical signals, as described below, to realize a real-time measuring system 10.

Figure 2:
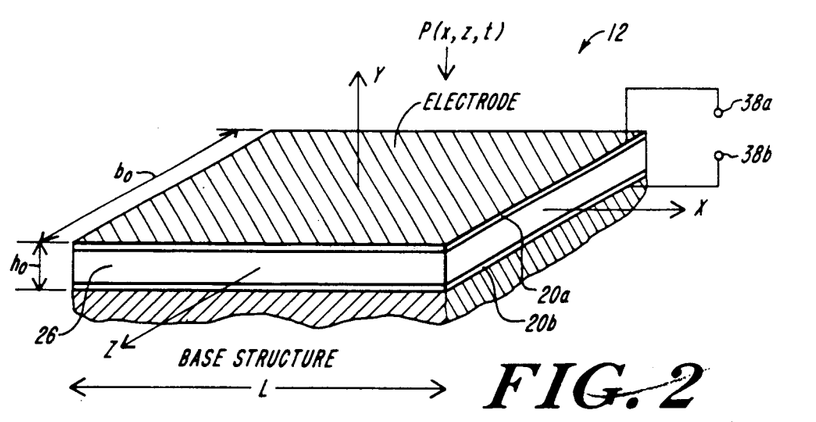
FIG. 2 is a perspective view of a dynamic pressure sensor having an electrode with a uniform weighting factor according to a preferred embodiment of the present invention.
Figure 3:
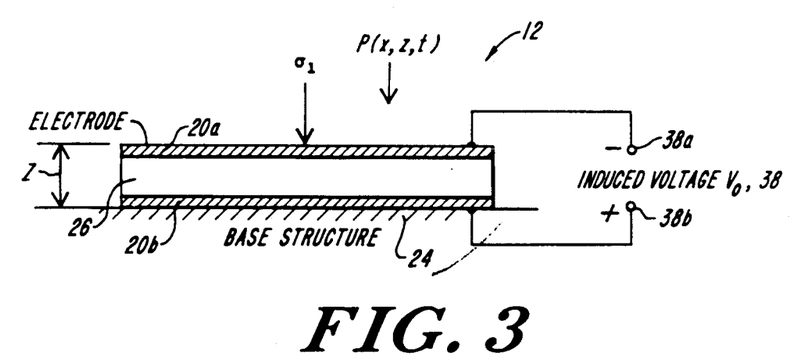
FIG. 3 is a cross-sectional view depicting a piezo layer under a normal pressure field in accordance with the present invention.

FIG. 2 shows a perspective view of sensor 12 and FIG. 3 shows a cross-sectional view along the x-axis of the reference coordinate system shown in FIG. 2. The sensor 12 is comprised of piezo layer (or film) 26 positioned between a pair of opposed, substantially parallel conductive layer (or sensor electrode) 20a and conductive layer (or substrate electrode) 20b. The lower electrode layer 20b is supported on the surface of a rigid base structure 24, and in embodiments where the structure 24 is electrically conductive, may be that structure itself.

The piezo layer 26, for example formed by a piezoelectric or piezoresistive material, is comprised of a material that has at least one electrical parameter that is a function of an applied stress. A piezoelectric material, whose charge distribution which develops on the surface of layer 26 is a function of the applied stress, permits dynamic measurements of a pressure field. An exemplary piezoelectric material for piezo layer 26 is a polyvinylidene fluoride (PVF$_2$) film, such as manufactured by Penwalt Corporation, King of Prussia, Pa., in the thickness in the range 9 to 9000 m.

A piezoresistive material, whose electrical resistance within layer 26 is a function of the applied stress, permits both dynamic and static measurements of a pressure field. An exemplary piezoresistive material for piezo layer 26 is a polymer film, such as those utilized in connection with type FSR devices or products manufactured by Interlink Electronics, Santa Barbara, Cal.

The strain response of layer 26 may be conditioned, for example by shading or weighting, utilizing an appropriately shaped electrode 20a and/or an appropriately selected strain response transfer function of piezo layer 26. The strain response transfer function of piezo layer 26 is characterized as a relationship between the variation in the thickness of piezo layer 26 and/or the variation in the characteristics of the strain response of piezo layer 26.

Where piezo layer 26 is a piezoelectric material, the relationship between the methods of conditioning and the strain response is:

$q(x) \alpha f(x) * b(x),$
where:

$f(x) = d(x)/t(x),$ and $q(x)$ = charge distribution on the surface of layer 26;

$b(x)$ = shaping of electrode (i.e., electrode profile) 20a;

$f(x)$ = strain response transfer function of layer 26;

$d(x)$ = variation in the strain response characteristics of layer 26 along the x axis; and $t(x)$ = variation in the thickness of layer 26 along the x axis.

Thus, an appropriately shaped electrode 20a, together with a linear variation in the thickness of piezo layer 26, and a variation in the characteristics of the strain response of piezo layer 26, exclusively or in any combination, may be utilized to condition the strain response of piezo layer 26 (as measured across electrodes 20a and 20b) to measure and characterize a particular pressure parameter adjacent to rigid surface 24.

In the illustrated embodiment, sensor 12 utilizes a selectively shaped electrode 20a to condition the strain response of piezo layer 26 to measure and characterize a pressure parameter adjacent to rigid surface 24. Furthermore, the strain response characteristics of layer 26, $d(x)$, and the thickness of layer 26, $t(x)$, are substantially uniform and substantially constant throughout layer 26; thus, the conditioning of the strain response of layer 26 is accomplished utilizing the effect of the shaping of electrode layer 20a exclusively. The electrode layers 20a and 20b, are comprised of electrically conductive materials, for example gold or nickel, with a thickness in the range 100 to 400 Angstroms.

In the illustrated embodiment piezo layer 26 is comprised of a piezoelectric type material. Thus, sensor 12 structure is similar to that of a parallel plate capacitor in that electrode layers 20a and 20b correspond to the capacitor plates and piezo layer 26 corresponds to the dielectric material. In the presence of a dynamic pressure field $P(x,z,t)$ in the region above electrode layer 20a, a potential difference develops across the electrodes layers. That potential difference (which may be measured as a voltage 38 across terminals 38a and 38b), is a function of the dynamic pressure field $P(x,z,t)$, the shape(es) of the electrodes $b(x)$, and any "noise" due to vibration and/or deflection of rigid base structure 24. Processing unit 14 utilizes voltage 38, measured at terminals 38a and 38b, to generate the pressure parameter established by the shape of electrode layer 20a. Thus, the output voltage of sensor 12 is of the form:

$$V(pf, es, \text{"noise"}) = Q(P(x,z,t), b(x), \text{"noise"})/C, \quad (1)$$

where:

$V$ = resultant voltage measured across terminals 38a and 38b of sensor 12;

$Q$ = charge distribution on the surface of piezo layer 26; and $C$ = effective capacitance of sensor 12.

More particularly, in response to the pressure field, piezo layer 26 generates a strain response. The strain response creates a charge distribution on the surface of piezo layer 26 and a resultant electric field develops within layer 26. The total charge distribution that develops on the surface of piezo layer 26 is a function of the applied compressive strain due to a dynamic pressure field and any "noise" due to vibration and/or deflection of rigid base structure 24.

A detailed description of the various elements of system 10 follows.

1. Piezo Layer 26

The piezo layer 26 generates a strain response in the presence of a pressure field P(x,z,t) as a result of an applied compressive stress on the surface of layer 26. Piezo layer 26 is comprised of a material that has at least one electrical parameter that is a function of an applied stress.

In the illustrated embodiment, piezo layer 26 is comprised of a piezoelectric type material, such as $PVF_2$. As described above, the stress on a piezoelectric layer generates a charge distribution on the surface of the layer and a resultant electric field develops within the layer.

The charge distribution on a differential element of sensor 12 along the x-axis of layer 26 due to the applied compressive stress is defined as:

$$q(x,t) = [k^2_{33}/g_{33}]b(x)\epsilon_f(x,t),$$

where:
- $b(x)$ = weighting factor due to the shape of electrode 20a;
- $g_{33}$ = strain constant of layer 26;
- $k_{33}$ = electromechanical coupling factor of layer 26; and
- $\epsilon_f(x,t)$ = strain in the differential element of layer 26.

In this model, the contribution to the charge distribution due to the deflection, bending, and/or structural vibration of rigid base structure 24 is not incorporated, but is addressed in detail, in the noise component section, below. Thus, the ideal relationship of the strain to the stress and charge distribution due to the dynamic pressure field in layer 26 is:

$$\epsilon_f(x,t) = E_f \sigma_f(x,t),$$

where:
- $E_f$ = Young's Modulus in layer 26; and
- $\sigma_f(x,t)$ = surface stress on layer 26.

Thus, the charge distribution in the differential element is:

$$q(x,t) = [k^2_{33}/g_{33}]b(x)E_f\sigma_f(x,t).$$

Integrating along the x-axis over the length of sensor 12, the total charge Q(t) produced on the surface of layer 26 is $$Q(t) = [k^2_{33}/g_{33}] E_f * \int_0^L b(x)\sigma_f(x,t)dx.$$

The compressive stress results from a generalized pressure distribution and thus:

$$Q(t) = [k^2_{33}/g_{33}] E_f * \int_0^L b(x)P(x,t)dx. \tag{2}$$

As described above, sensor 12 may be characterized as similar to a parallel plate capacitor, wherein electrodes 20a and 20b act as the capacitor plates and layer 26 acts as a dielectric layer. Thus, the voltage at terminals 38a and 38b, utilizing the charge relationship defined in EQU. 2 and the capacitor relationship detailed in EQU. 1, is:

$$V_o(t) = K_o * \int_0^L [b(x)P(x,t)]dx. \tag{3}$$

where:
- $K_o[E_f k^2_{33}/C_s g_{33}]$;
- $C_s = c(A_s/h_o)$, the capacitive relationship of sensor 12;
- $A_s$ = cross sectional area of sensor 12;
- $h_o$ = thickness of layer 26; and
- $\epsilon$ = effective permittivity of layer 26.

As detailed in EQU. 3, the electric potential measured across electrode plates 20a and 20b is a function of the shape b(x) of electrode 20a, the dynamic pressure field P(x,t), and the constant $K_o$.

2. Sensor Electrode

As described above, the shape of electrode 20a defines the dynamic pressure parameter to be characterized. A detailed description of the relationship between the shape of this electrode and the output of sensor 12 follows.

The shape of electrode 20a conditions the response of piezo layer 26 to the dynamic and/or static pressure field. As detailed in EQU. 3, the potential difference, generated by a piezo layer comprised of a piezoelectric material, is directly proportional to the shape of electrode 20a, defined by variable b(x).

An electrode layer having a shape as depicted in FIG. 2, causes a uniform conditioning of the response of piezo layer 26 to a pressure field. A uniform conditioning incorporates a constant relationship into the response of piezo layer 26 to a dynamic or static pressure field. Thus, an electrode layer of this shape incorporates as constant relationship of $b(x) = b_o$ into EQU. 3, the voltage relationship of a piezo layer comprised of a piezoelectric material, and thereby conditions the response of layer 26 such that the potential difference measured across terminals 38a and 38b is:

$$V_o(t) = K_o * \int_0^L [b_0 P(x,t)]dx. \tag{4}$$

Thus, the voltage $V_o(t)$ corresponds to the "zeroth moment coefficient" ($C_l$) of the surface.

Figure 4:
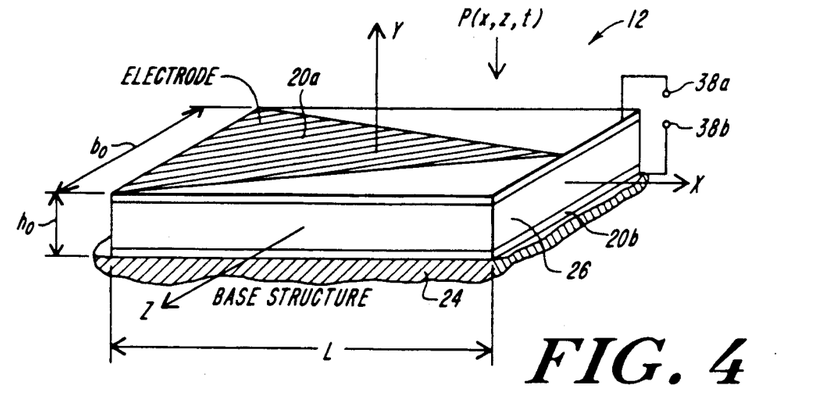
FIG. 4 is a perspective view of a dynamic pressure sensor having an electrode with a linear weighting factor according to a preferred embodiment of the present invention.

An electrode layer having a shape as depicted in FIG. 4, creates a linear conditioning of the response of piezo layer 26. A linear conditioning incorporates a linear relationship into the response of piezo layer 26 to a dynamic or static pressure field. Thus, an electrode layer of this shape incorporates the linear relationship of $b(x) = b_1 x$ into EQU. 3, the voltage relationship of a piezo layer comprised of a piezoelectric material, and thereby conditions the response of layer 26 such that the potential difference measured across terminals 38a and 38b is:

$$V_o(t) = K_o * \int_0^L [b_1 x P(x,t)]dx. \tag{5}$$

Thus, the voltage $V_o(t)$ now corresponds to the "first moment coefficient" ($C_m$) of the surface.

Figure 5:
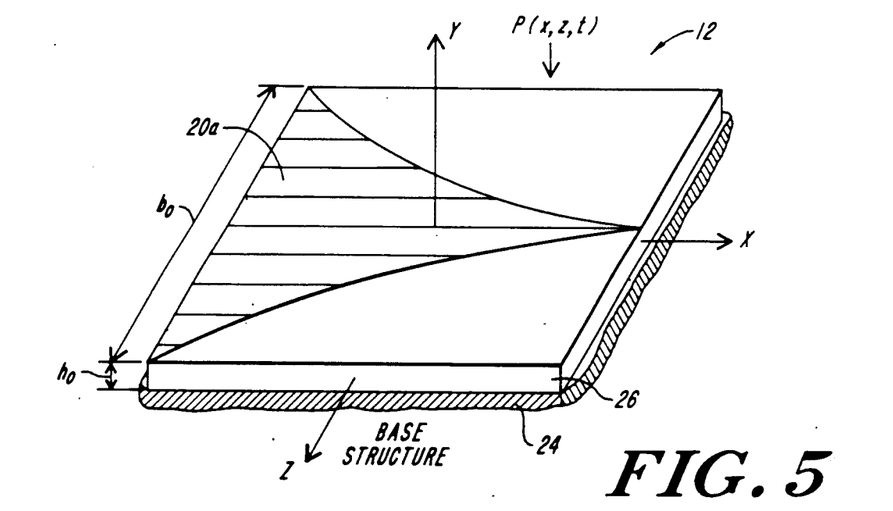
FIG. 5 is a perspective view of a dynamic pressure sensor having an electrode with a quadratic weighting factor according to a preferred embodiment of the present invention.

Furthermore a squared weighting factor of the stress response of piezo layer 26, incorporating a $b(x) = b_2 x^2$ into EQU. 3, is achieved through the shape of electrode layer 20a depicted in FIG. 5, providing a voltage corresponding to the "second moment coefficient" of the surface.

3. Center of Pressure Sensor

For the purpose of clarity, without intending to limit the scope of the invention to a specific dynamic and/or static pressure parameter, the shape of the electrodes to characterize the center of pressure parameter about the leading edge of an airfoil, is described in detail below.

The center of pressure about the leading edge of an airfoil is defined as the ratio of the moment coefficient, $C_m$, to the lift coefficient, $C_l$. An electrode, overlying a piezoelectric layer, having a shape that provides a uniform conditioning of that the piezo layer, as shown in FIG. 2 and whose potential difference relationship is defined in EQU. 4, is proportional to the local or sectional lift coefficient. An electrode, overlying a piezoelectric layer, having a shape that provides a linear conditioning of the piezo layer, as shown in FIG. 4 and whose potential difference relationship is defined in EQU. 5, is proportional to the sectional moment coefficient. Thus, the center of pressure CP about the leading edge of an airfoil, defined as:

$$CP|_x = C_m/C_l,$$

may be described, utilizing EQU. 4 and 5, as:

$$CP|_x = [K_3/L] * \left[ \left( \int_0^L xP(x,t)dx \right) \bigg/ \left( \int_0^L P(x,t)dx \right) \right], \quad (6)$$

where:

$$K_3 = b_1/b_0$$

which is analogous to the gain of center of pressure sensor 12.

Figure 6:
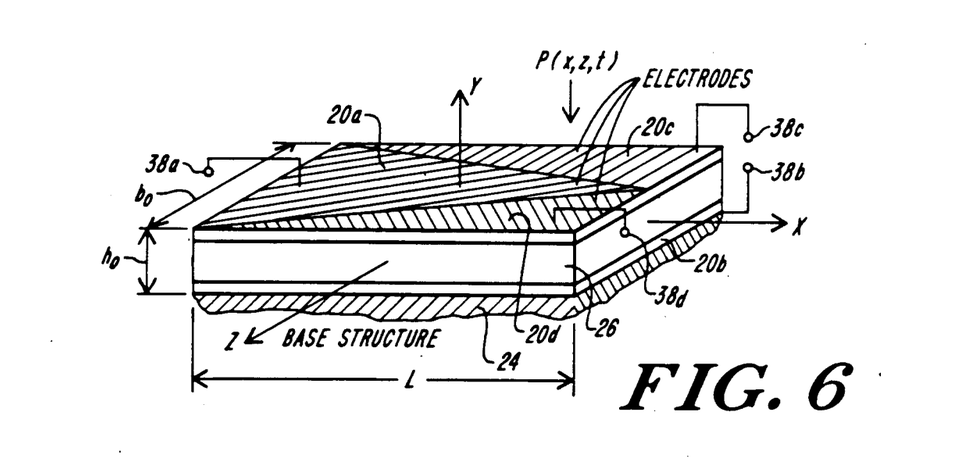
FIG. 6 is a perspective view of a dynamic pressure sensor for the characterization of the center of pressure parameter according to a preferred embodiment of the present invention.

A preferred embodiment of a center of pressure sensor 12 is depicted in FIG. 6. In that figure, the sensor electrode is shown as a composite structure including three electrically isolated portions 20a, 20c and 20d. The voltages measured across terminals 38a and 38b, 38c and 38b, and, 38d and 38b from electrodes 20a and 20b, 20c and 20b, and, 20d and 20b, respectively, combine to yield a uniform weighting distribution whose output voltage relationship that is described by EQU. 4. The voltage measured across terminals 38a and 38b from electrodes 20a and 20b generate a linear weighting distribution whose output voltage relationship is described by EQU. 5.

The output voltages are supplied, via system bus 16, to processing unit 14 which manipulates these electrical signals as defined by EQU. 6 to realize a real-time center of pressure measurement system.

In addition to measuring the center of pressure about the leading edge of an airfoil, a one dimensional pressure characterization, a plurality of pressure sensors disposed upon a rigid structure are utilized, in combination, to translate the one dimensional pressure characterization into a two dimensional pressure characterization. As detailed in the above, a sensor disposed upon a rigid structure measures and characterizes a dynamic pressure field along one dimension of the rigid structure. A plurality of sensors characterizes the dynamic pressure field at plurality of locations that are defined by the distinct location of the sensors. The processing unit utilizing the plurality of sensor outputs manipulates each sensor output to generate a topological representation of a pressure parameter defined by the locations of the sensors. Thus, an array of pressure sensors that are disposed upon a rigid structure may be utilized in combination to translate the one sensor one dimensional characterization into a two dimensional pressure parameter characterization.

4. "Noise" Contribution

In embodiments where the piezo film has piezoelectric characteristics, the contribution to the charge distribution due to "noise", i.e. deflection, bending, and/or structural vibration of the base structure may be determined in the following manner.

Figure 7:
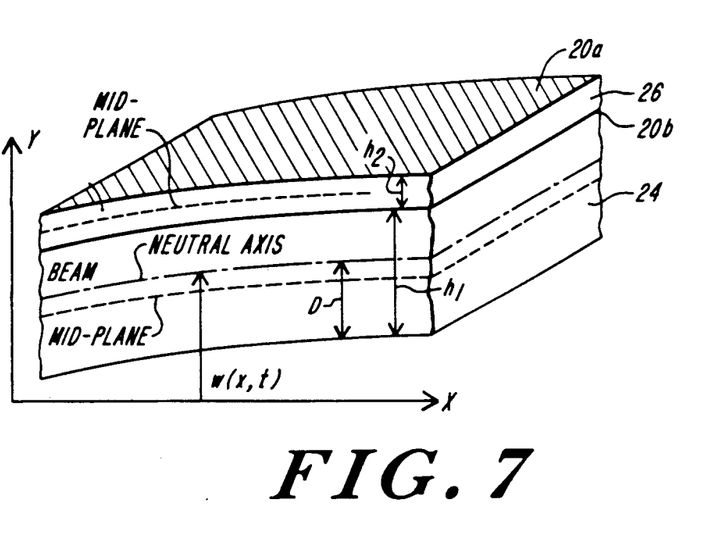
FIG. 7 is a perspective view of a dynamic pressure sensor attached to a rigid base structure that is under deflection due to structured vibration according to the invention.

The strain distribution in piezoelectric layer 26 due to local deformation and structural vibrations in rigid base structure 24 are related to the charge distribution on the surface of piezoelectric layer 26 as follows described:

$$q(x) = (k^2_{31}/g_{31}) * b(x)\epsilon_n(x),$$

where;

$b(x)$ = weighting factor due to the shape of electrode 20a;
$k^2_{31}$ = electromechanical coupling factor of layer 26;
$g_{31}$ = strain constant of layer 26; and
$\epsilon_n(x)$ = strain distribution of layer 26.

With reference to FIG. 7, the strain distribution is described in terms of the curvature of the composite sensor-rigid body structure. Thus the strain distribution is:

$$\epsilon_n(x) - D * W_{xx},$$

where;

$W_{xx}$ = the second derivative of the lateral displacement of base structure 24 with respect to the x-axis; and $D$ = the distance from the base of structure 24 to the neutral axis (shown in FIG. 7).

Integrating over the length L of sensor 12, the total charge produced on the surface of piezoelectric layer 26, due to the total charge resulting from "noise", is defined as:

$$Q(t) = [k^2_{31}/g_{31}] * \int_o^L [b(x) DW_{xx}]dx. \quad (7)$$

The charge produced by the "noise" at each electrode is related to the potential difference across terminals 38a and 38b of sensor 12 and is determined by integrating EQU. 7 by parts, providing the leakage resistance of piezoelectric layer 26 is high. Thus, output voltage 38 of sensor 12 due to the "noise" component is:

$$V_n(x,t) = (K_3/C_o) * \int_o^L [b''(x)w(x,t)]dx, \quad (8)$$

where:

$K_3 = (D*k^2_{31})/g_{31}$, and the boundary conditions are:

$$w(x,t)b'(x) \bigg|_o^L = w'(x,t)b(x) \bigg|_o^L.$$

and b''(x) = the second derivative of b(x) with respect to the argument, x; and b'(x) = the first derivative of b(x) with respect to the argument, x.

Thus, the invention may be used to provide a characterization of the center of pressure quantified above with compensation for the charge on the surface of piezoelectric layer 26 due to local deformation and structural vibration of rigid base structure 24. Utilizing EQUs. 6 and 8, in conjunction with the theory of superposition, the voltages from the electrodes of sensor 12, reported to the electronics unit 14, are:

$$VT(t) = CP|_x + V_n(t),$$

where $CP|_x$ and $V_n(x,t)$ are defined in EQU. 6 and 8, respectively.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim

1. A device for characterizing pressure distribution on a surface with respect to at least one reference (x) axis, comprising:
   A. a substrate defining said surface, said surface being rigid,
   B. a substrate electrode disposed on said surface,
   C. a piezo film at least partially disposed on and overlying said substrate electrode, said film being characterized by a predetermined strain response transfer function, and
   D. a sensor electrode having a portion disposed on and overlying at least part of said piezo film and said substrate electrode, said portion having a predetermined width profile b(x) in the direction transverse to said reference axis, whereby a total charge on said film as a function of time, O(t), is established in said piezo film substantially proportional to: $_0\int^L b(x)P(x,t)dx$
   where L is representative of the maximum dimension of said sensor electrode in said x direction, where t is representative of time, and P(x,t) is representative of said pressure distribution on said surface as a function of x and t,
   E. means for generating a signal representative of O(t), said signal being representative of a predetermined characteristic of said pressure distribution on said surface.

2. A device according to claim 1 wherein said sensor electrode is a composite electrode, said composite electrode including at least two electrically isolated and adjacent portions, one of said portions having a dimension transverse to said reference axis which varies in proportion to position along said reference axis from a reference point and defining a first portion, and the other of said portions having a dimension transverse to said reference axis which varies in proportion to one minus position along said reference axis extending from said reference point and defining a second portion.

3. A device according to claim 2 further comprising:
   A. means coupled to said first portion for generating a $C_m$ signal representative of the potential difference between said first portion and said substrate electrode,
   B. means coupled to said first portion and said second portion for generating a $C_l$ signal representative of the sum of the potential difference between said first portion and said substrate electrode and the potential difference between said second portion and said substrate electrode,
   C. means for generating a CP signal representative of the ratio of said $C_m$ signal and said $C_l$ signal.

4. A device according to claim 1 wherein said sensor electrode fully overlies said piezo film.

5. A device according to claim 4 further comprising means for generating a signal representative of the potential difference between said sensor electrode and said substrate electrode.

6. A device according to claim 1 wherein said sensor electrode has a dimension transverse to said reference axis which varies in proportion to position along said reference axis.

7. A device according to claim 6 further comprising means for generating a signal representative of the potential difference between said sensor electrode and said substrate electrode.

8. A device according to claim 1 wherein said sensor electrode has a dimension transverse to said reference axis which varies in proportion to the square of position along said reference axis.

9. A device according to claim 8 further comprising means for generating a signal representative of the potential difference between said sensor electrode and said substrate electrode.

10. A device according to claim 1 wherein said surface is electrically conductive and said substrate electrode is established by said surface.

11. A device according to claim 1 wherein said strain response transfer function is a function of x, f(x), and is determined by equation: $f(x) = d(x)/t(x)$,
    wherein d(x) is representative of variation in strain response characteristics of said piezo film in a direction transverse to said reference axis as a function of x, and t(x) is representative of said piezo film thickness in a direction transverse to said reference axis as a function of x.

12. A device according to claim 11 wherein said thickness of said piezo film is substantially uniform.

13. A device according to claim 11 wherein said characteristics of the strain response of said piezo film is substantially uniform.

14. A device according to claim 11 wherein said thickness of said piezo film is substantially uniform and said characteristics of the strain response of said piezo film is substantially uniform.

15. A device according to claim 1 wherein said piezo film is piezoelectric film.

16. A device according to claim 12 wherein said piezo film is polymer film.

17. A device according to claim 15 wherein said piezo film is polyvinylidene fluoride.

18. A device according to claim 1 wherein said piezo film is piezoresistive film.

19. A device according to claim 2 wherein said surface is electrically conductive and said substrate electrode is established by said surface.

20. A device according to claim 2 wherein said strain response transfer function f(x) is determined by equation: $f(x) = d(x)/t(x)$, wherein d(x) is representative of variation in strain response characteristics of said piezo film in a direction transverse to said reference axis, and t(x) is representative of said piezo film thickness in a direction transverse to said reference axis.

21. A device according to claim 20 wherein said thickness of said piezo film is substantially uniform.

22. A device according to claim 20 wherein said characteristics of the strain response of said piezo film is substantially uniform.

23. A device according to claim 20 wherein said thickness of said piezo film is substantially uniform and said characteristics of the strain response of said piezo film is substantially uniform.

24. A device according to claim 2 wherein said piezo film is polymer film.

25. A device according to claim 24 wherein said piezo film is polyvinylidene fluoride.

26. A device according to claim 2 wherein said piezo film is piezoresistive film.

27. A device for characterizing pressure distribution on a surface with respect to at least one reference (x) axis, comprising:
A. a substrate defining said surface, said surface being rigid,
B. a substrate electrode disposed on said surface,
C. a piezo film at least partially disposed on and overlying said substrate electrode, said film being characterized by a predetermined strain response transfer function,
D. a sensor electrode having a portion disposed on and overlying at least part of said piezo film and said substrate electrode, said portion having a predetermined width profile b(x) in the direction transverse to said reference axis, whereby a total charge on said film as a function of time, Q(t), is established in said piezo film substantially proportional to:

$$\alpha \int_0^L b(x) P(x,t) dx$$

where L is representative of the maximum dimension of said sensor electrode in said x direction, where t is representative of time, and P(x,t) is representative of said pressure distribution on said surface as a function of x and t, said sensor electrode further being a composite electrode, said composite electrode including at least two electrically isolated and adjacent portions, one of said portions having a dimension transverse to said reference axis from a reference point which varies in proportion to position along said reference axis and defining a first portion, and the other of said portions having a dimension transverse to said reference axis which varies in proportion to one minus position along said reference axis extending from said reference point and defining a second portion, E. means coupled to said first portion for generating a $C_m$ signal representative of the potential difference between said first portion and said substrate electrode, F. means coupled to said first portion and said second portion for generating a $C_l$ signal representative of the sum of the potential difference between said first portion and said substrate electrode and the potential difference between said second portion and said substrate electrode, and G. means for generating a CP signal representative of the ratio of said $C_m$ signal and said $C_l$ signal.

28. A device according to claim 1 wherein $b(x)=b_0$, where $b_0$ is a constant, and said signal corresponds to the zeroth moment of said pressure distribution.

29. A device according to claim 1 wherein $b(x)=b_1 x$, where $b_1$ is a constant, and said signal corresponds to the first moment of said pressure distribution.

30. A device according to claim 1 wherein $b(x)=b_2 x^2$, where $b_2$ is a constant, and said signal corresponds to the second moment of said pressure distribution.

* * * * *

UNITED STATES PATENT AND TRADEMARK OFFICE
CERTIFICATE OF CORRECTION

PATENT NO. : 5,054,323
DATED : October 8, 1991
INVENTOR(S) : James E. Hubbard Jr.

It is certified that error appears in the above-indentified patent and that said Letters Patent is hereby corrected as shown below:

Column 3, line 43 delete "9000 m" and substitute therefore -- 1000 $\mu$m --.

Column 6, line 6 after "$K_o$" insert -- = --.

Column 6, line 8 after "$C_s$ =" delete "C" and substitute therefore -- $\epsilon$ --.

Column 8, line 31 after "(x)" insert -- = --.

Signed and Sealed this

Twenty-sixth Day of April, 1994

Attest:

BRUCE LEHMAN

*Attesting Officer*  *Commissioner of Patents and Trademarks*